United States Patent
Alzner et al.

(10) Patent No.: US 6,762,430 B2
(45) Date of Patent: Jul. 13, 2004

(54) IMAGING PLATE GUIDES

(75) Inventors: Edgar Alzner, Garden City, NY (US); Stephen Zamprelli, Bardonia, NY (US); Tom Lloyd, New Hyde Park, NY (US); Walter Gross, Massapequa, NY (US)

(73) Assignee: Air Techniques, Inc., Hicksville, NY (US)

( * ) Notice: Subject to any disclaimer, the term of this patent is extended or adjusted under 35 U.S.C. 154(b) by 48 days.

(21) Appl. No.: 10/310,560

(22) Filed: Dec. 5, 2002

(65) Prior Publication Data

US 2003/0128814 A1 Jul. 10, 2003

Related U.S. Application Data

(60) Provisional application No. 60/340,171, filed on Dec. 7, 2001.

(51) Int. Cl.$^7$ .................................................. G03C 5/16
(52) U.S. Cl. ........................ 250/584; 250/589; 378/174
(58) Field of Search ................................. 250/589, 590, 250/591, 581–584, 234, 559.2; 378/191, 168–169, 174; 358/408

(56) References Cited

U.S. PATENT DOCUMENTS 6,566,642 B1 * 5/2003 Yoshida .................... 250/208.1
6,586,749 B2 * 7/2003 Cimino et al. ......... 250/455.11
6,599,014 B2 * 7/2003 Thoms ........................ 378/184

* cited by examiner

Primary Examiner—Edward J. Glick
Assistant Examiner—Hoon Song
(74) Attorney, Agent, or Firm—Louis E. Marn

(57) ABSTRACT

An imaging plate guide formed in different configurations corresponding to the various intraoral dental plate sizes, which in turn correspond to the dental intraoral film sizes commonly referred to as sizes 0 through 4, the imaging plate guides dedicated to intraoral imaging providing for guides for each plate size so that a desired array of feed width guides can be positioned on the scanner for scanning the intraoral plates and which scan extraoral imaging plates as well. The embodiment of the imaging plate guides provides not only for interchangeability with respect to the intraoral plate size, but also allows for the feeding of extraoral imaging plates without the need to remove the intraoral plate guides. The size 4 is not specifically described, but is analogous to the other sizes as would be obvious to one skilled in the art.

4 Claims, 11 Drawing Sheets

IMAGING PLATE GUIDES

RELATED APPLICATIONS

Applicant claims the benefit of provisional application Ser. No. 60/340,171, filed Dec. 7, 2001.

BACKGROUND OF THE INVENTION

1. Field of the Invention

The present invention relates to imaging plate guides and more particularly to imaging plate guides used in conjunction with a dental scanner.

2. Description of the Prior Art

In dental technology, intraoral x-ray images have traditionally been obtained by placing x-ray film in the patient's oral cavity behind the tooth or teeth to be imaged. The film must be oriented correctly to optimize the region of the mouth that will be contained in the film's image. In processing the film to make the latent image visible, films are processed either manually or by automatic film processors that use developer, fixer, wash and drying phases for the complete process. Since the images are contained within the film and are viewed by looking through the film, the angular orientation of the film within the processor is not critical except in some circumstances and perhaps for the reliability of the transporting of the film through the particular processors. The film is then viewed in either the portrait or landscape orientation as determined by the initial placement of film in the oral cavity, and for intraoral films, the films are typically placed into film holders for viewing.

Dental technology is now in the age of digital imaging. There are two basic types of digital imaging modalities, namely, CCD or CMOS based sensors (sometimes referred to as "lollipops" because the wire that protrudes from such a sensor is reminiscent of a lollipop stick) and the photostimulable phosphor (PSP) imaging plates. For the sensors which are direct reading, like film, the oral cavity orientation of the sensor is the only alignment requirement. However, for PSP imaging plates, although the latent image is contained within the imaging plate, much like film, the latent image has to be "read" opto-mechanically and the orientation of the imaging plate relative to the reading mechanism will determine how well the resulting images are oriented with respect to the portrait or landscape orientations, and therefore how well it is aligned with the digital holders within which the images are placed. If the reading line is inclined with respect to the axis of the imaging plate, then the rectangular image will appear skewed in the digital display device. Due to the nature of pixelized digital image data, de-skewing the image by computer rotation, requires two sets of coordinate transformations and/or interpolations, thereby losing image data and image resolution which is unacceptable. Also, most likely two sets of data would probably have to be stored, the original skewed data for legal data integrity reasons and an aligned display image for quick viewing, as reconstruction from the original skewed data to aligned display data is time consuming.

Therefore, the reader or scanner must read the plate in an aligned fashion. To accomplish this the image plates are placed either into holders or feed guides that orient them correctly with respect to the read lines. In batch process readers, a plate is automatically or manually placed into a frame that retains the imaging plate in the desired orientation. In continuous feed readers, provision has to be made to keep the plates aligned correctly while the plates are translated through the device and past the orthogonally or near orthogonally oriented read line. Typically, unique size holders for each plate size are required, intraoral and extraoral plates require holders that must be interchanged when going from one type to the other and the guides are either adjusted in their width or are exchanged for different widths. It is therefore desirable to develop imaging plate guides which permit the scanning of all sizes of intraoral image plates and allow scanning of extraoral image plates without having to remove the intraoral plate guides, yet allow interchange of intraoral plate guides when a different size plate is to be read.

OBJECTS OF THE INVENTION

An object of the present invention is to provide for imaging plate guides corresponding to the different sizes of dental intraoral film and extraoral imaging plates.

Another object of the present invention is to provide for imaging plate guides, which could be preloaded with imaging plates, and then inserted into their guide locations on the scanners.

A still further object of the present invention is to provide for novel imaging plate guides in which the guide slot is dimensioned to minimize skewing of the plate by no more than one half degree to one degree.

A still further object of the present invention is to provide for a novel imaging guide which is provided with a stop limiting means to allow the plate to be pushed only as far as necessary to engage the scanner transport mechanism.

A still further object of the present invention is to provide interchangeable intraoral plate guides that do not have to be removed to scan extraoral imaging plates.

SUMMARY OF THE INVENTION

An imaging plate guide formed in different configurations corresponding to the various intraoral dental plate sizes, which in turn correspond to the dental intraoral film sizes commonly referred to as sizes 0 through 4, the imaging plate guides dedicated to intraoral imaging providing for guides for each plate size so that a desired array of feed width guides can be positioned on the scanner for scanning the intraoral plates and which scan extraoral imaging plates as well. The embodiment of the imaging plate guides provides not only for interchangeability with respect to the intraoral plate size, but also allows for the feeding of extraoral imaging plates without the need to remove the intraoral plate guides. The size 4 is not specifically described, but is analogous to the other sizes as would be obvious to one skilled in the art.

BRIEF DESCRIPTION OF THE DRAWINGS

These and other objects of the present invention will become evident particularly when taken in light of the following illustrations wherein.

DETAILED DESCRIPTION OF THE DRAWINGS

Figure 1:
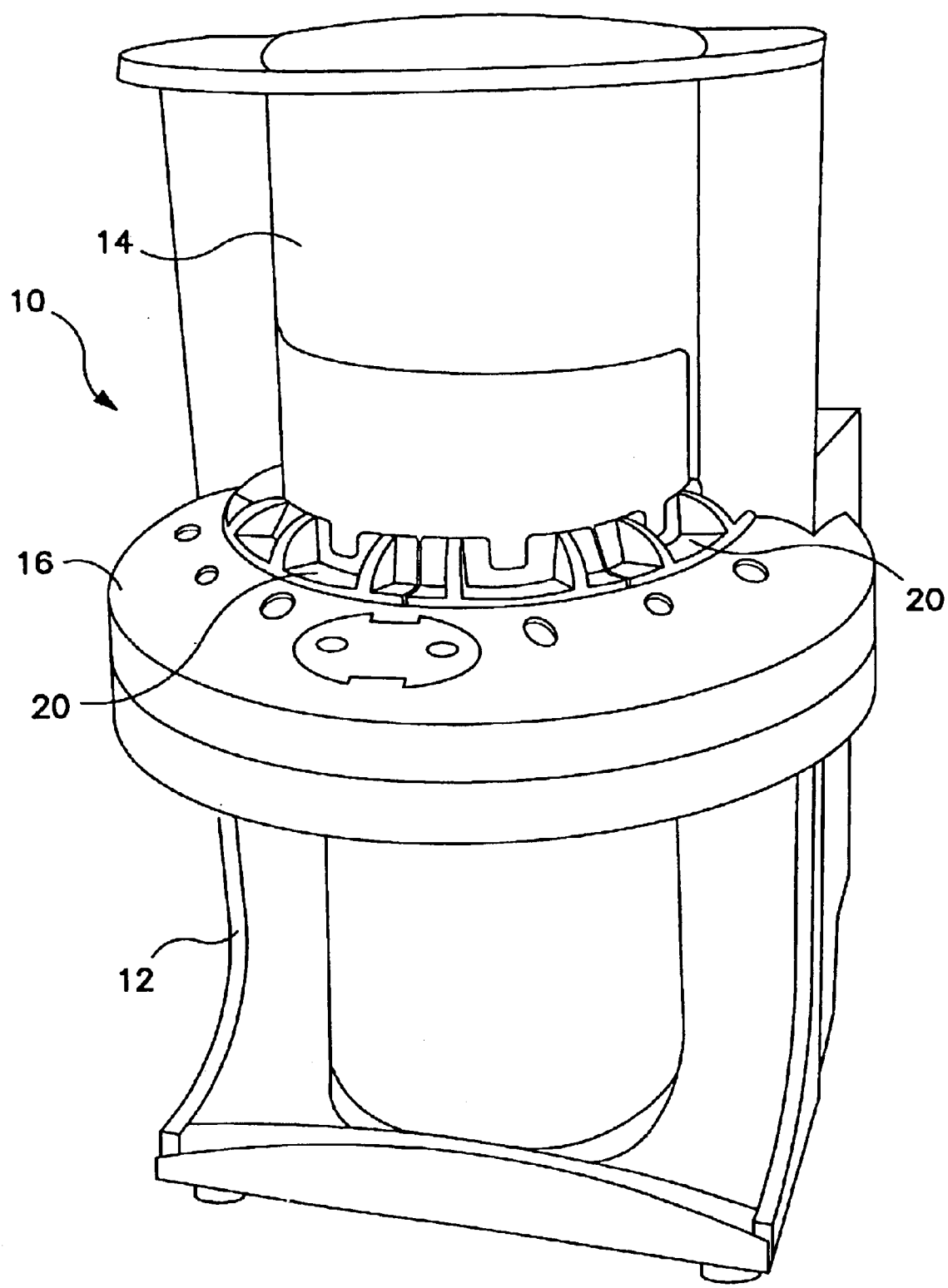
FIG. 1 is a perspective view of a dental scanner incorporating the novel imaging plate guides of the present invention.

FIG. 1 is a perspective view of a dental scanning machine 10 which consists of a frame 12, an inlet feed cylinder 14, and a transport arch cover 16. The transport means for the imaging plate and the scanner mechanism for reading the imaging plate by a laser scanner mechanism are within the frame 12 and below cover 16. A plurality of imaging plate guides 20 are positioned atop the transport arch cover 16 and partially circumferentially about the inlet feed cylinder, the imaging plate guides for the introduction of the imaging plate into the scanner mechanism for reading.

Figure 2:
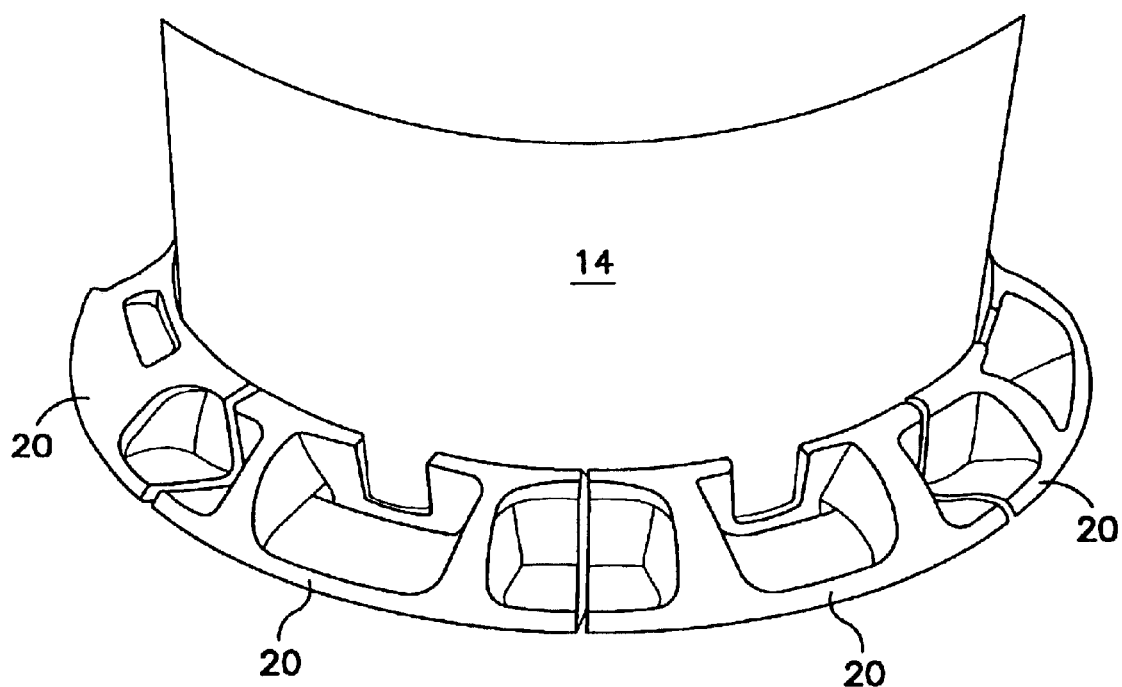
FIG. 2 is a close up partial prospective view of FIG. 1 illustrating the novel imaging plate guides.

FIG. 2 is a perspective close up view of the imaging plate guides 20 positioned about the inlet feed cylinder 14, atop the transport cover 16. In the configuration illustrated, there are four imaging plate guides positioned about inlet feed cylinder 14. Those illustrated comport with sizes 0, 1, 2, and 3 imaging plate sizes.

Figure 3:
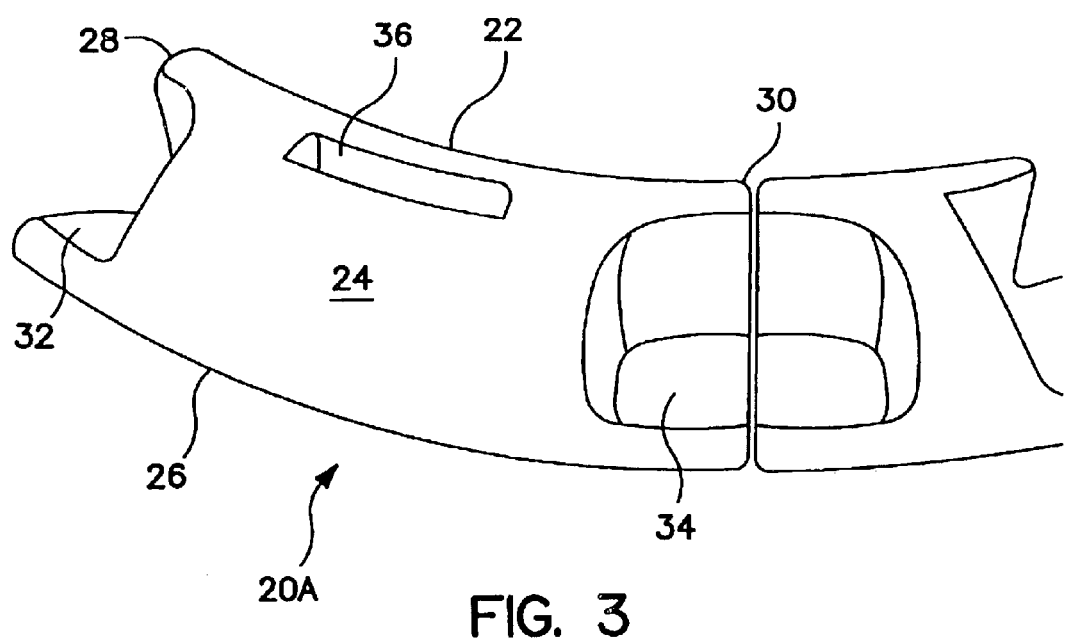
FIG. 3 is a close up perspective view of the novel imaging plate guide for size 3 intraoral plates.

FIG. 3 is a close up perspective view of an imaging plate guide 20A comporting to a size 3 imaging plate. It is arcuate in shape, having an arcuate rear face 22 complimentary to the circumference of the inlet feed cylinder 14. Its front face 24 is also contoured from the rear face 22 to the bottom face 26. At the ends 28 and 30 of the imaging guide, there are formed finger grip pockets 32 and 34 which allow the user to grip the imaging plate guide and lift and remove it from its position on the scanner. Imaging plate guide 20A is also formed with a slot 36 on its front face 24 proximate arcuate rear face 22. The slot 36 illustrated in FIG. 3 is dimensioned to comport to the size of a size 3 imaging plate. As described in more detail hereafter, the size 3 imaging plate would be inserted into the slot 22 and pushed downwardly by the users finger or other suitable apparatus. The height of the rear face 22 of the size 3 imaging plate guide is dimensioned such that when the user's finger engages the surface of the imaging plate guide, the size 3 imaging plate is at the correct location to be engaged by the transporter mechanism of the scanner, beneath and adjacent the upper transport arch cover 16.

FIG. 3 illustrates an imaging plate guide 20A for use with a size 3 imaging plate. The remaining imaging plate guides differ in their front face contours, but share the commonality of the arcuate rear face, bottom face, and ends and figure grip pockets as illustrated with imaging guide 20A.

Figure 4:
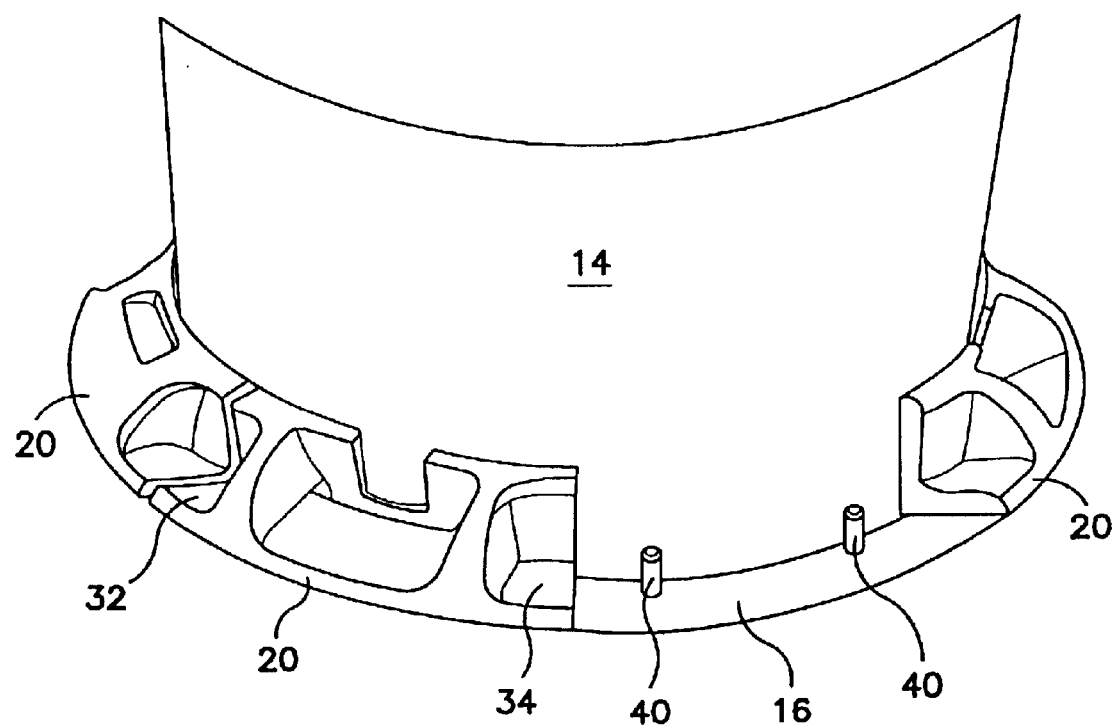
FIG. 4 is a close up partial perspective view of the scanner and imaging plate guides with one imaging plate guide removed to illustrate a mounting method.

FIG. 4 is a partial perspective of a scanner with one of the imaging plate guides 20 removed. This partially illustrates one manner in which the imaging plate guides are engaged to the scanner. In this embodiment, a plurality of upstanding pins 40 are positioned on the transport arch cover 16 about the inlet feed cylinder 14. These pins 40 engage bores formed on the underside of each imaging plate guide 20. Further, the arcuate rear face 20 of the imaging plate guide 20 extends downwardly below the arcuate edge of the transport cover arch 16 as more fully disclosed hereafter. In this configuration, the user can easily engage the finger grips 32 and 34 of the selected imaging plate guide 20 and lift it upwardly to remove it from the scanner 10. The imaging plate guides 20 could also be retained in position by a fitting unitarily molded in the transport cover arch 16 and a complementary receptacle formed on the bottom face 26 of imaging plate guide 20.

Figure 5:
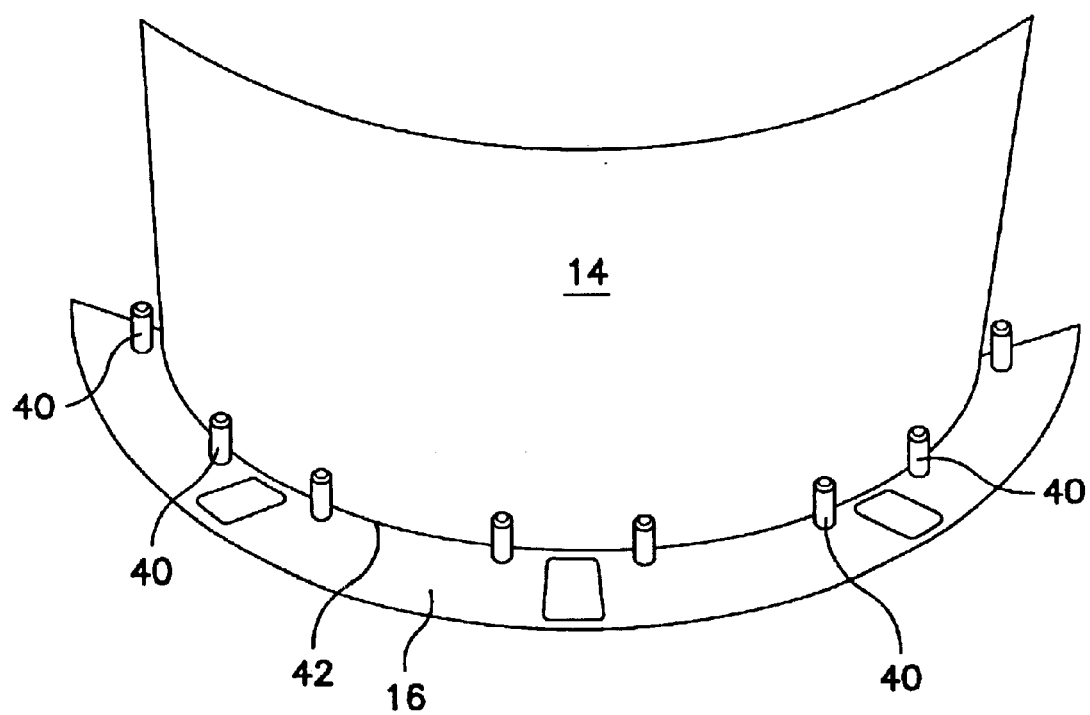
FIG. 5 is a view of the upper transport arch cover with all guides removed.

FIG. 5 is a partial cross-sectional view of the scanner cover tray with the scanner guides removed. The pins which engage the respective image guides and their relationship to the scanner cover are more clearly illustrated. Additionally, the inner circumferential edge of the transport cover 16 is illustrated and is formed with a nine degree chamfer to aid in the positioning of the imaging plate guides. Also illustrated is the inlet feed slot 42 adjacent inlet feed cylinder 14. The nine degree angle is approximate and could be ±2 degrees for example.

Figure 6:
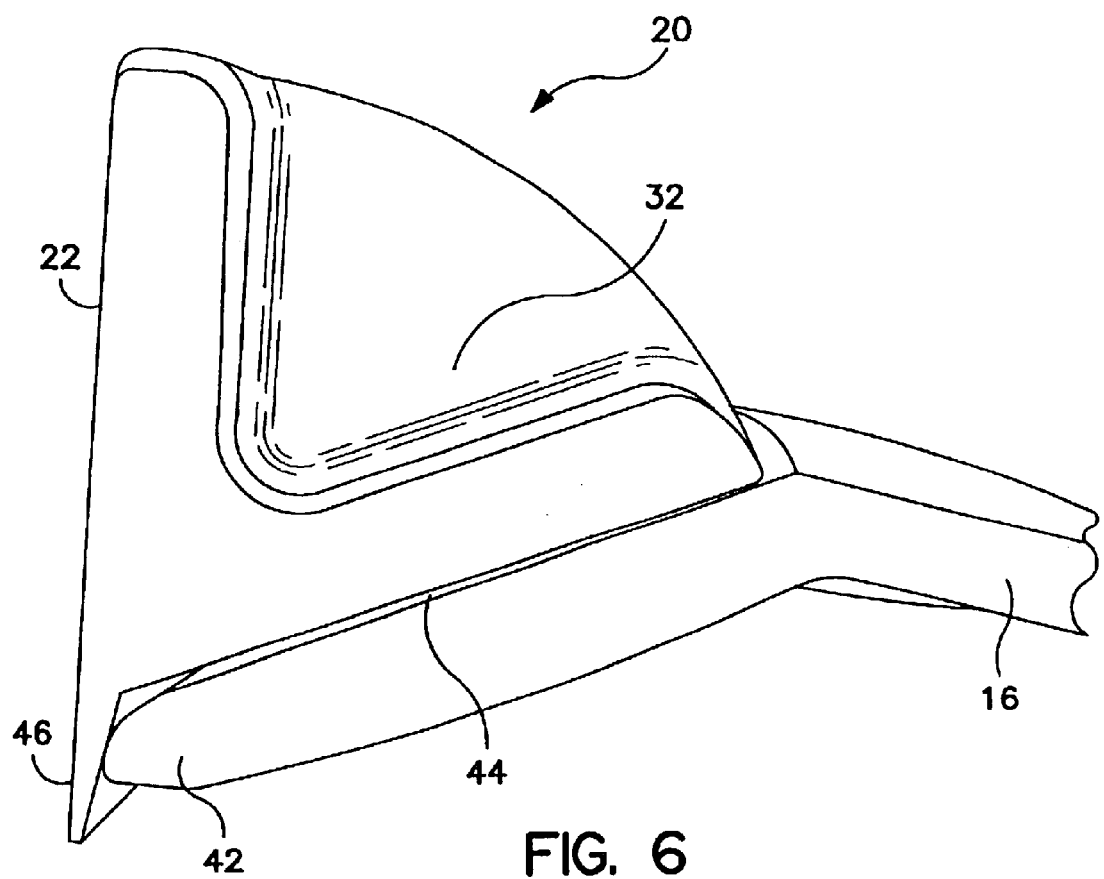
FIG. 6 is a cross-sectional view of the upper transport arch cover with an imaging plate guide illustrating the imaging plate guide from an end view.

FIG. 6 is an end view of an imaging plate guide 20 positioned on the transport cover 16. The transport cover 16 is formed with a sloping or conical surface 44 adjacent to inlet feed cylinder to which the lower surface 26 of the imaging plate guide 20 mates. The arcuate rear surface 20 of the imaging plate guide extends below the edge of the conical surface 44 forming a guide tab 46 for positioning the imaging plate guide and aiding in the feed of the imaging plates. It should be noted that such guides and cover tray surfaces are also applicable to straight as opposed to conical or cylindrical surfaces as would be the case for a flat feed inlet as opposed to a cylindrical feed inlet.

Figure 7:
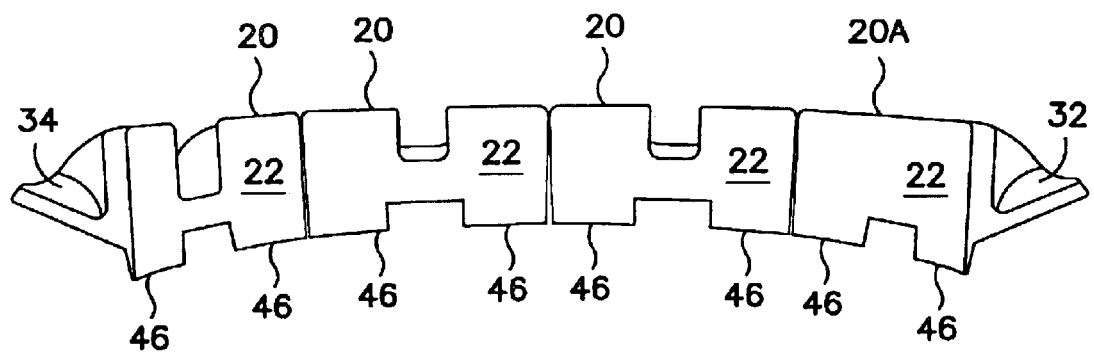
FIG. 7 is from inside the scanner viewing the imaging plate guides from their rear.

FIG. 7 is a rear view of four imaging plate guides 20 sizes 0, 1, 2, and 3 from left to right, positioned on the conical portion of the transport cover, more clearly illustrating the manner in which the guide tabs extend below the conical surface 44 to a dimension which is equal to each adjacent guide tab on imaging plate guides 20. In this configuration, the size 4 imaging plates and the extraoral film/plates can be fed into the scanner not by the slots formed in the imaging plate guides, but by utilizing the gap between the arcuate rear surfaces 22 of the aligned imaging guides and the inlet feed cylinder 14 (not shown).

Figure 11:
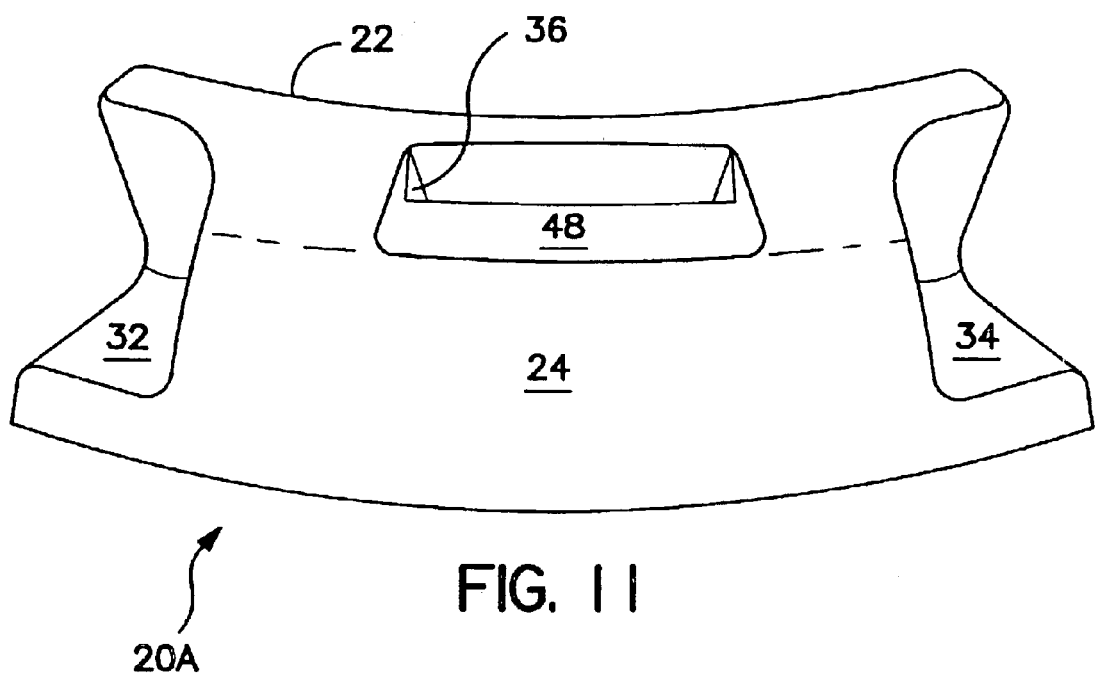
FIG. 11 is a front view of an imaging plate guide for a size 3 imaging plate.

FIGS. 8, 9, 10, and 11 are front perspective views of imaging plate guides for size 0, 1, 2, and 3 imaging plates respectively. The size of the imaging plates vary with size 0 being the smallest and extending up to size 3 being the largest that can be inserted into a scanner through one of the imaging plate guides 20. Occlusal imaging plates, size 4, are still larger, and a panoramic size plate would be larger than the occlusal. As a frame of reference, a size 0 imaging plate would measure 22×35 mm. A size 1 imaging plate would measure 24×40 mm. A size 2 imaging plate would measure 31×41 mm. And a size 3 imaging plate would measure 27×54 mm. An occlusal imaging plate would measure 57×76 mm and the panoramic size plate would measure 5 inches× 12 inches and a cephalometric plate measures 8 inches×10 inches and corresponding metric sizes are also used. Due to the various sizes, it is desirable, albeit imperative, that the imaging plates be inserted uniformly into the scanner so that the transport means engages the imaging plate in the same repetitive manner regardless of its size. To achieve this result, the imaging plate guides 20 vary in the contour of their front surface and the height of the slot within the imaging plate guide 20. FIG. 3 illustrated the imaging plate guide 20A for imaging plate size 3. Imaging plate guide 20A is illustrated in FIG. 11, which gives a clearer view of the front face 24, slot 36, and a slightly flattened area or plateau 48 positioned on the side of slot 36 away from arcuate rear face 22. This plateau and the portion of the arcuate rear face 22 immediately adjacent slot 36 limits the depth to which the imaging plate can be inserted into imaging plate guide 20A. It will be noted with respect to FIGS. 8, 9, and 10, the depth of the plateau 48 and the height of the arcuate rear face 22 immediately adjacent slot 36 is varied in order to comport with the different size imaging plates in order to achieve the proper and uniform depth insertion to be engaged or pinched by the transport mechanism of the scanner.

Figure 8:
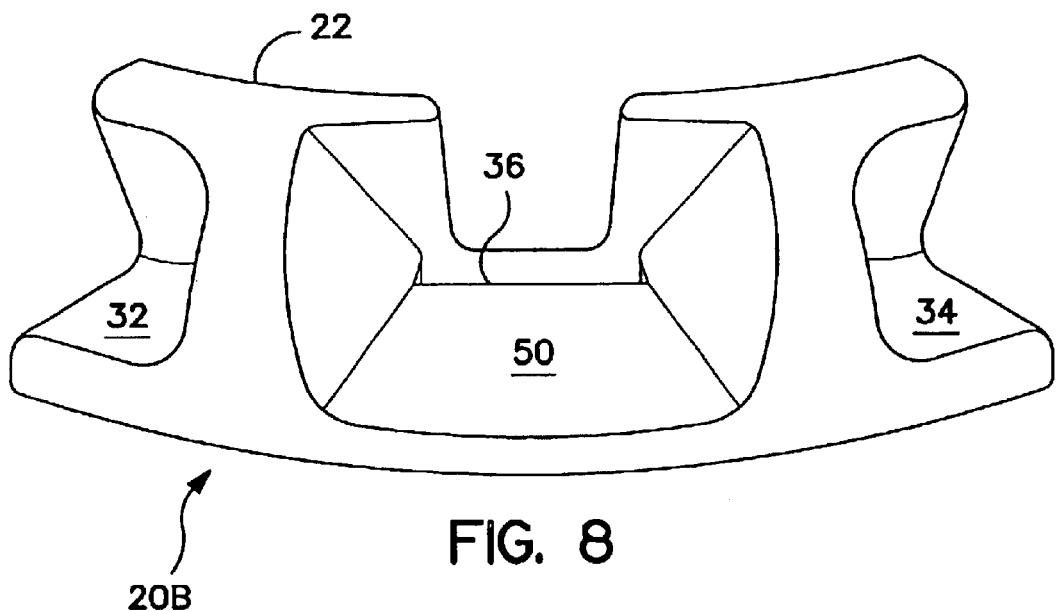
FIG. 8 is a view of an imaging plate guide for size 0 imaging plates.
Figure 9:
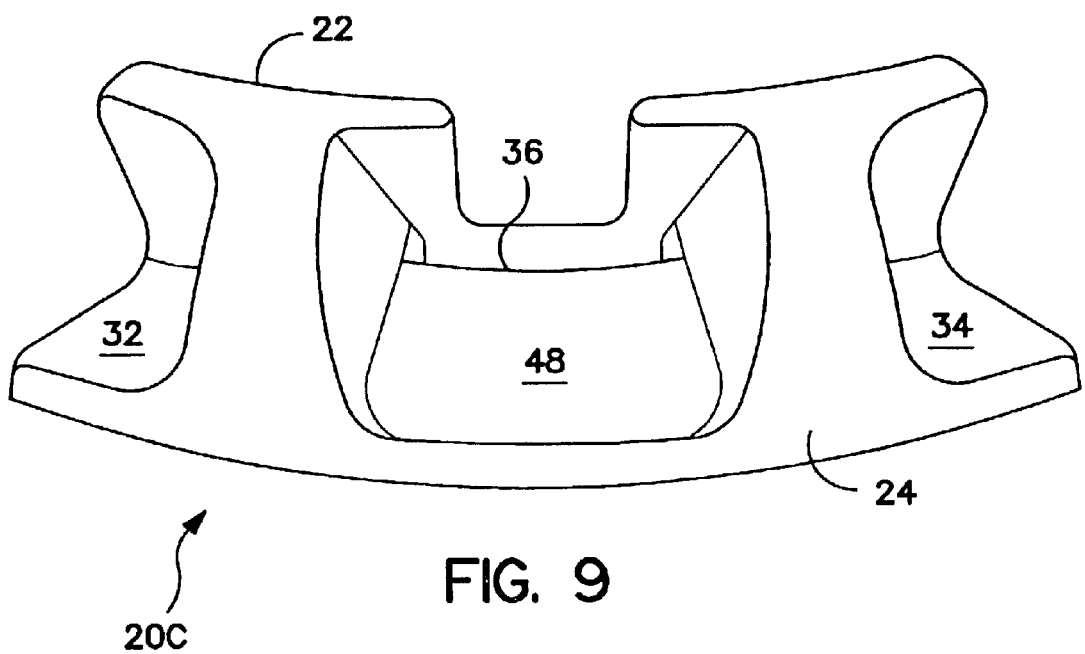
FIG. 9 is a view of an imaging plate guide for a size 1 imaging plate.
Figure 10:
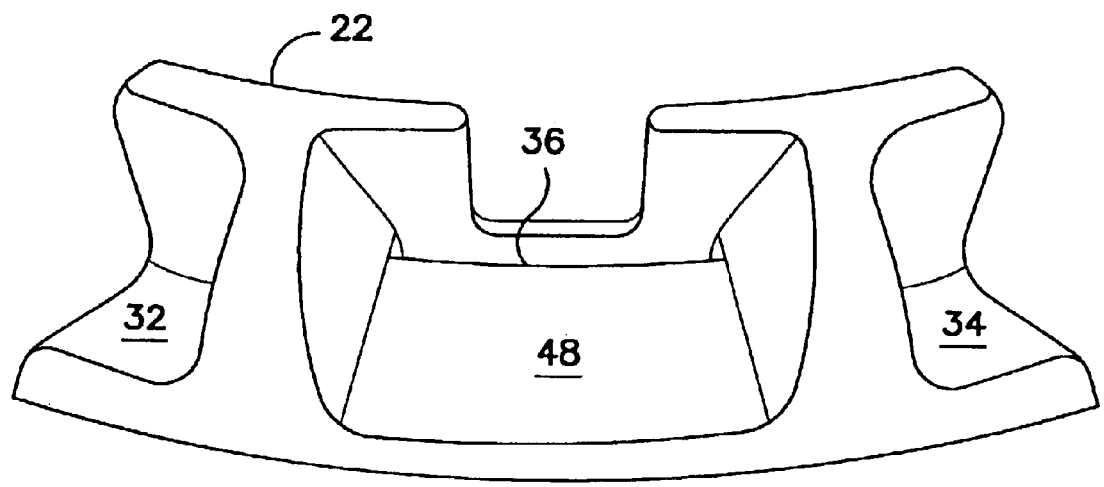
FIG. 10 is a front view of an imaging plate guide for a size 2 imaging plate.

FIG. 8 imaging plate guide 20B accommodate size 0 imaging plates and has the narrowest and shortest slot 36 and the deepest stop 50. The FIG. 9 imaging plate guide 20C for a size 1 imaging plate is slightly wider in slot size than the size 0 imaging plate guide. The size 2 imaging plate guide 20D illustrated in FIG. 10 has the widest slot 36 to accommodate the size 2 imaging plate.

Figure 12:
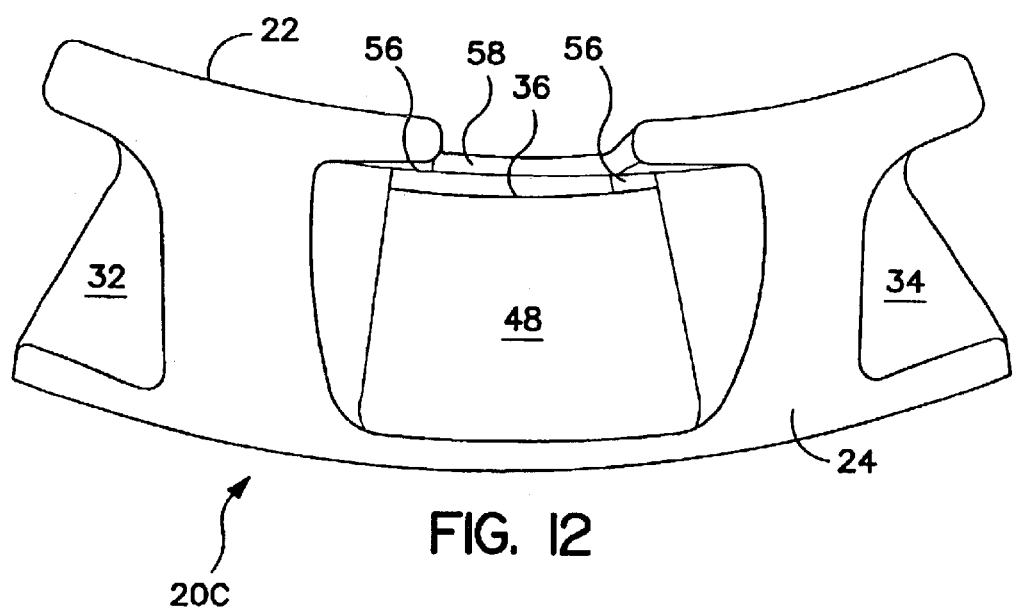
FIG. 12 is a top view of a size 2 imaging plate guide.

FIG. 12 is a top view of the size 2 imaging plate guide 20C. The slot 36 of this imaging plate guide 20C is representative of the slots of the other imaging plate guides with respect to its form. The slot 36 starts with a flat section 56 above the plateau 48 and transitions into a curved surface 58 which produces a parabolic witness line which aids in the feeding of the imaging plates. Other transitions are also valid as is obvious to one skilled in the art.

Figure 13:
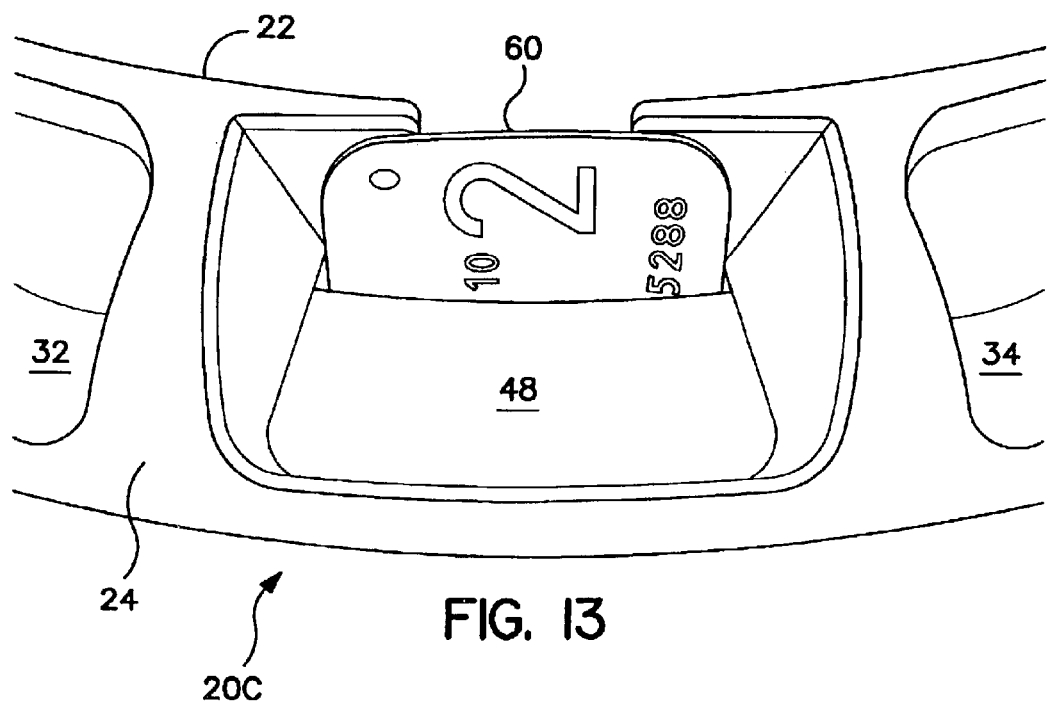
FIG. 13 is a front view of a size 2 imaging plate guide with imaging plate.
Figure 14:
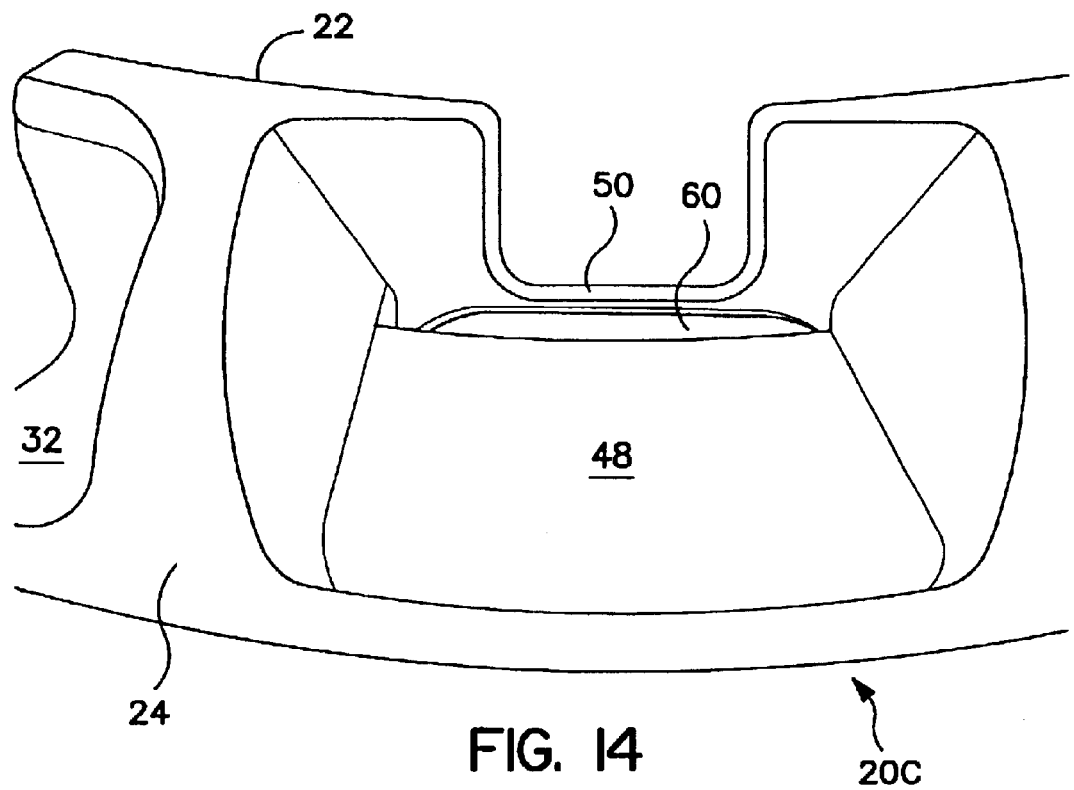
FIG. 14 is a front view of a size 2 imaging plate guide with imaging plate.
Figure 15:
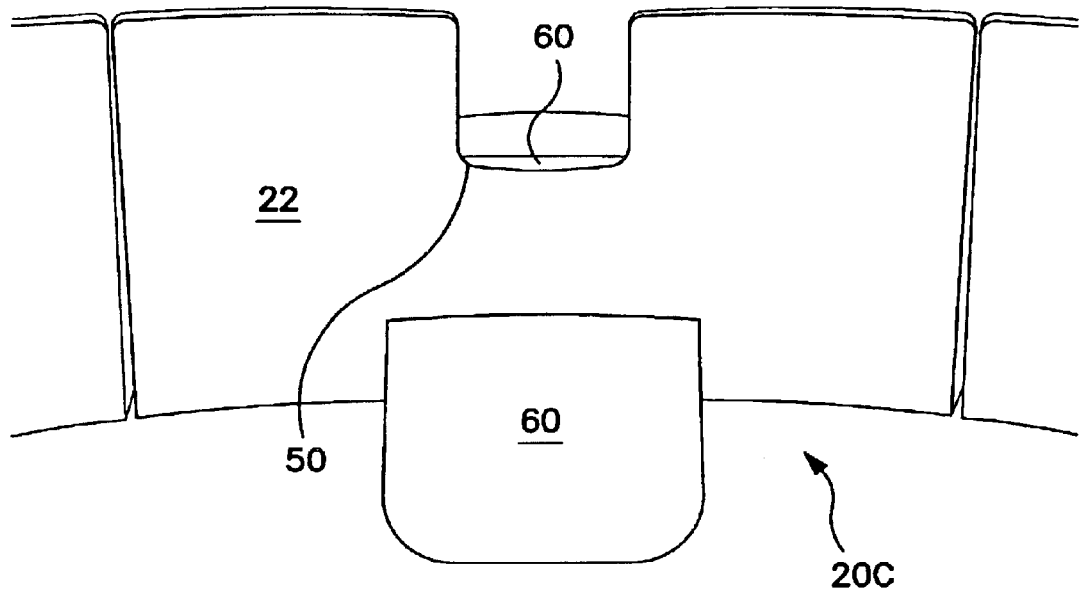
FIG. 15 is a rear view of a size 2 imaging plate guide with imaging plate.

FIGS. 13, 14, and 15 are illustrative of the insertion of an imaging plate 60 through an imaging plate guide and into the scanner. In FIG. 13, an imaging plate 60 is shown partially inserted into a size 2 imaging plate guide 20C. The user would continue to press the imaging plate 60 downwardly until the user's finger or the apparatus being used by the user contacted the stop 50 which is shown in FIG. 14. FIG. 14 illustrates the extent of the imaging plate insertion by finger or apparatus into the imaging plate guide. At the penetration depth illustrated in FIG. 14, the vertical axial transport mechanism of the scanner pinches and picks off the imaging plate for vertical movement downwardly in the scanner. FIG. 15 is an inside view of the imaging plate guide 20C of FIG. 14 illustrating imaging plate 60 fully inserted into the size 2 imaging plate guide 20C. The transport mechanism of the scanner would then be pinching or picking off this imaging plate for actual scanning. FIG. 1 is illustrative of a panoramic plate inserted into the slot formed between the rear face of the intraoral plate guides and the defining cylinder.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

We claim:

1. An image plate guide for use with an opto-mechanical scanner for orientation of image plates in feeding of said image plates into said opto-mechnical scanner for reading of said image plates, said image plate guide comprising:

a body member arcuate in shape between a first end and a second end, said body member defined by a bottom face having a plurality of pin engaging bores for positioning said image plate guide on said opto-mechanical scanner;

a rear face complimentary with said opto-mechanical scanner, said rear face extending a distance below said bottom face;

a front face disposed between said first end and said second end, said first end and said second end complimentary with adjacent image plates juxtaposed thereto, said front face having finger grip recesses formed adjacent said first end and said second end to facilitate handling of said image plate guide, said front face having centrally disposed, adjacent said rear face, a feed slot for orientation and insertion of said image plates into said opto-mechanical scanner.

2. The image plate guide in accordance with claim 1 wherein said image plate guide is dimensioned and arcuately curved in relationship to said opto-mechanical scanner to accommodate four image plate guides mountable on said opto-mechanical scanner.

3. The image plate guide in accordance with claim 2 wherein said feed slot of each of said image plate guides mounted on said opto-mechanical scanner varies to accommodate one of four sizes of said image plates.

4. The image plate guide in accordance with claim 3 wherein said rear face of said body member of said image plate guides complimentary with said opto-mechnical scanner cooperate to accommodate larger size image plates insertable between said rear face of adjacent image plate guides and said opto-mechanical scanner.

* * * * *